Dec. 21, 1943.   E. B. MARPLE   2,337,203
GREASE TRAP
Filed April 12, 1941   4 Sheets-Sheet 1
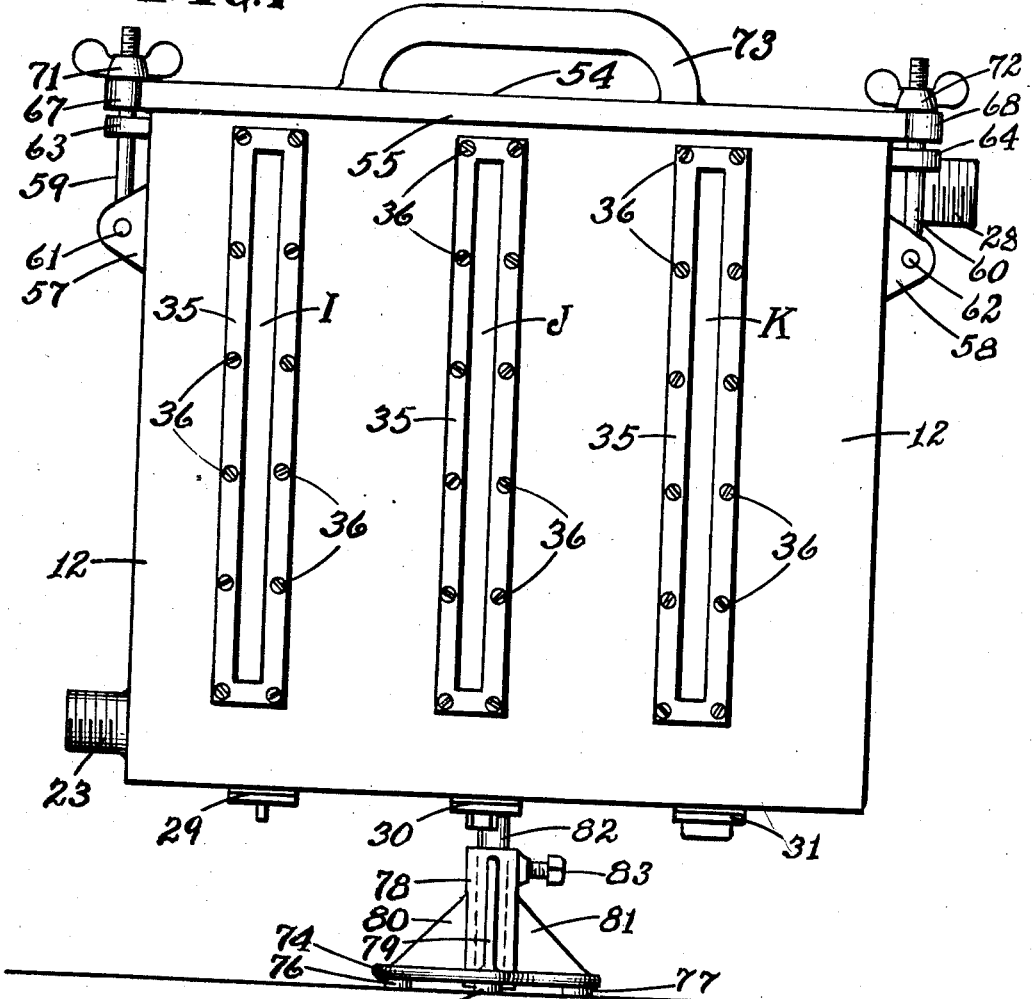
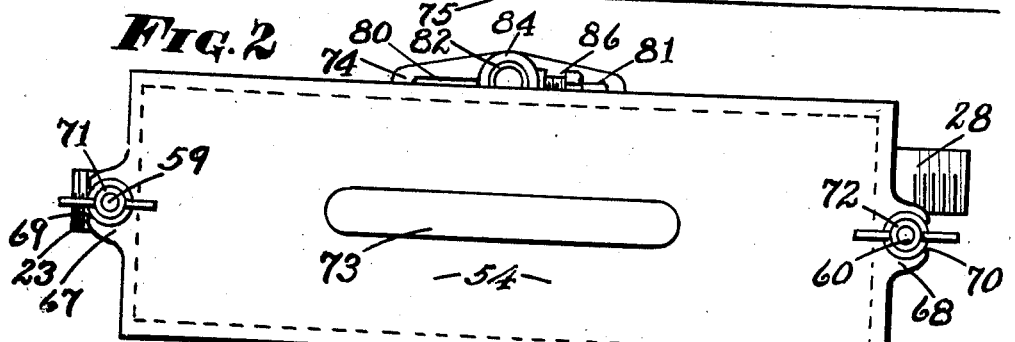
INVENTOR.
Elmore B. Marple
BY M. Y. Charles
ATTORNEY

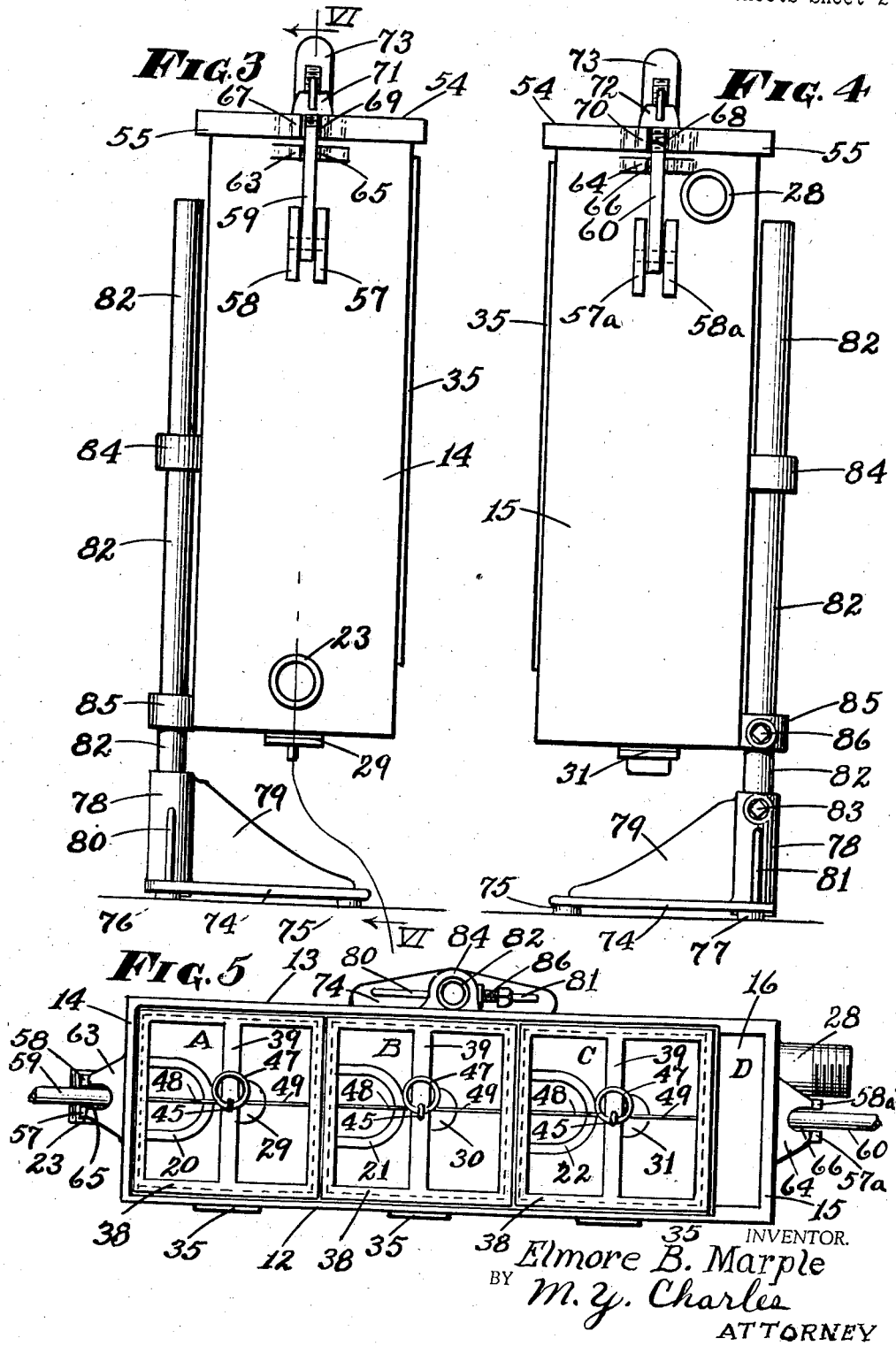
Dec. 21, 1943.  E. B. MARPLE  2,337,203
GREASE TRAP
Filed April 12, 1941  4 Sheets-Sheet 2
INVENTOR.
Elmore B. Marple
BY M. Y. Charles
ATTORNEY Dec. 21, 1943.  E. B. MARPLE  2,337,203
GREASE TRAP
Filed April 12, 1941  4 Sheets-Sheet 3
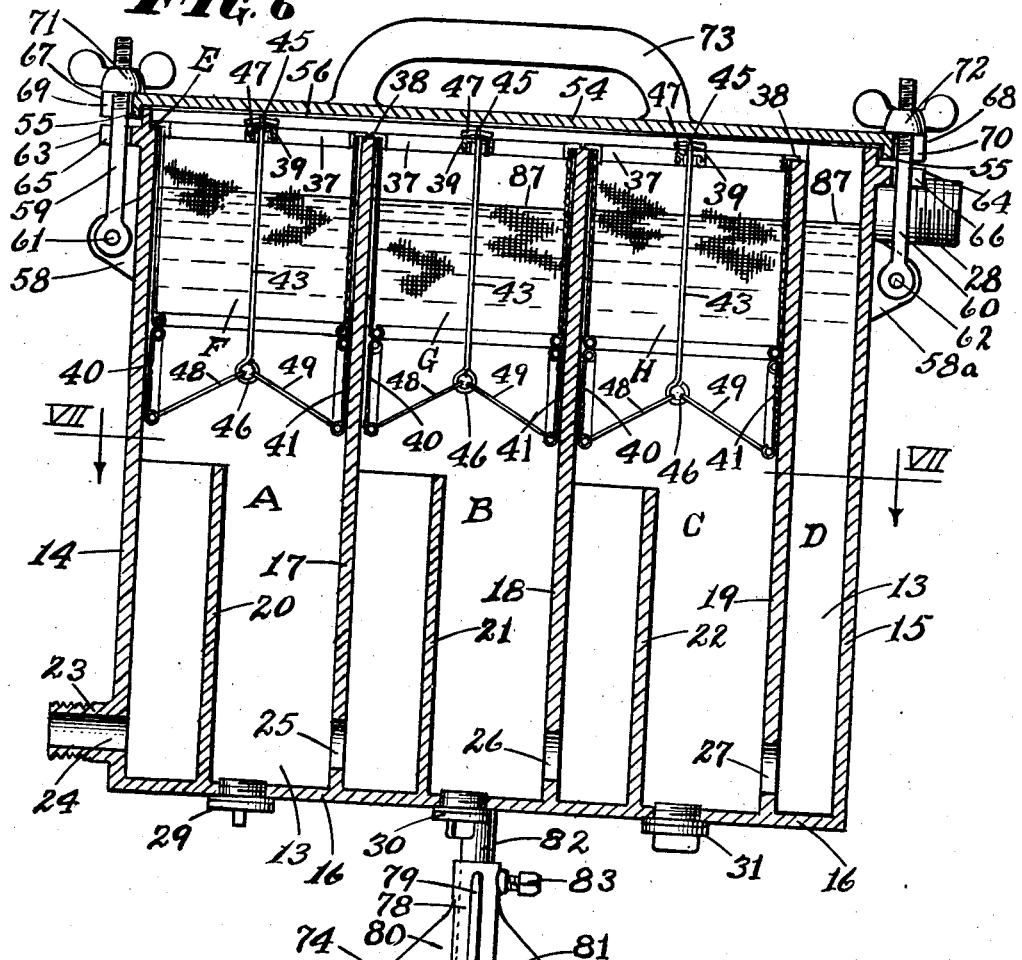
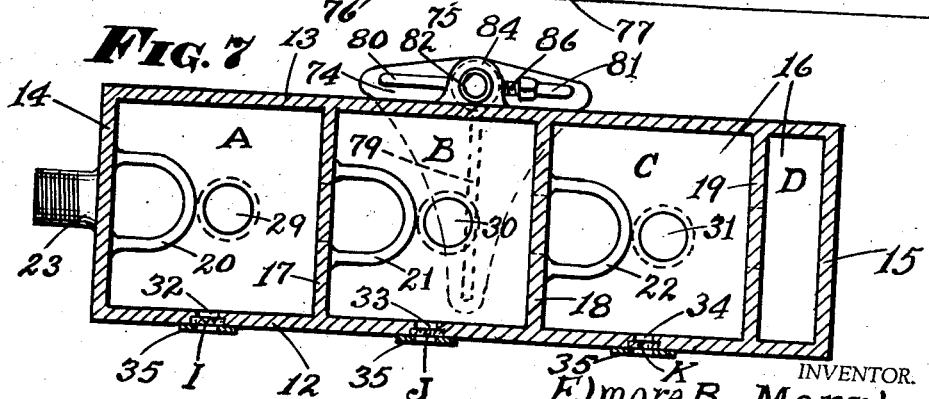
INVENTOR.
Elmore B. Marple
BY M. Y. Charles
ATTORNEY Dec. 21, 1943.  E. B. MARPLE  2,337,203
GREASE TRAP
Filed April 12, 1941  4 Sheets-Sheet 4
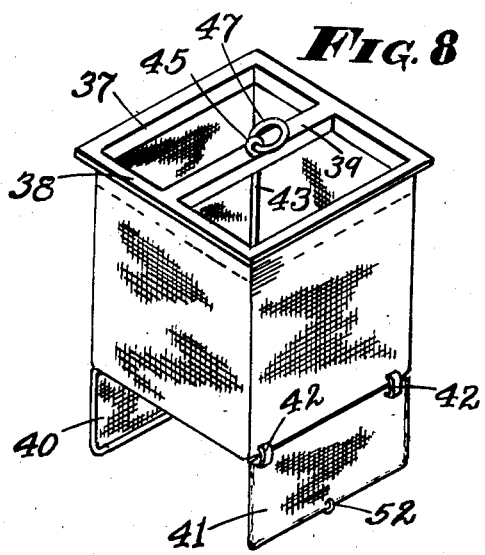
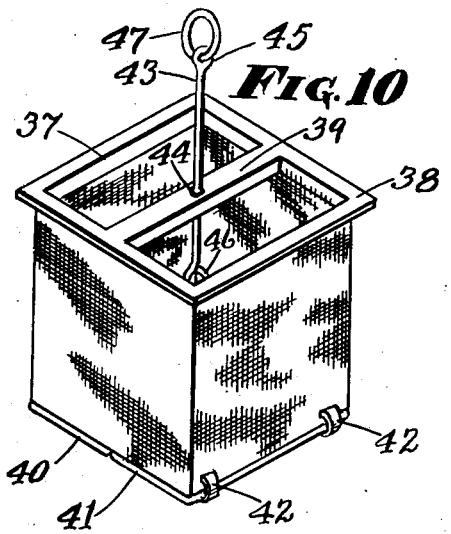
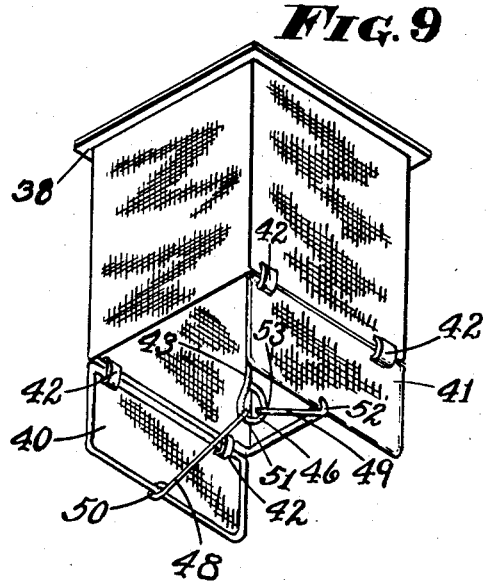
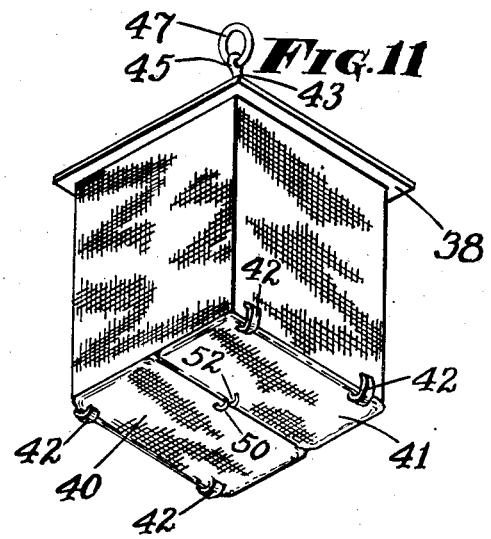
INVENTOR.
Elmore B. Marple
BY M. Y. Charles
ATTORNEY Patented Dec. 21, 1943

2,337,203

UNITED STATES PATENT OFFICE 2,337,203

GREASE TRAP

Elmore E. Marple, Wichita, Kans.

Application April 12, 1941, Serial No. 388,239

2 Claims. (Cl. 210—43)

My invention relates to an improvement in grease traps. The object of my invention is to provide a grease trap that is simple, easy and inexpensive to make. A further object is to provide a grease trap that has a plurality of trap compartments therein as a means of trapping a much larger percent of the grease than is caught in other grease traps. A still further object is to provide a grease trap of the kind mentioned and having automatic bottom closing basket traps that are easily and readily removable from the trap compartments. A still further object is to provide a grease trap of the kind mentioned in which the liquid traveling through the device travels a tortuous route thereby increasing the efficiency of the device in separating the grease from the water. These and other objects will be more fully described as this description progresses.

Now referring to the accompanying drawings

Fig. 1 is a front view of my improved grease trap device.

Fig. 2 is a top plan view of my improved grease trap device as shown in Fig. 1.

Fig. 3 is an end view of my improved grease trap device, the view being taken from the left side of Fig. 1.

Fig. 4 is an end view of my improved grease trap device, the view being taken from the right side of Fig. 1.

Fig. 5 is a top plan view of my improved grease trap device, the cover thereof being removed for convenience of illustration.

Fig. 6 is a longitudinal detail sectional view through my improved grease trap device, the view being taken along the line VI—VI in Fig. 3 and looking in the direction of the arrows.

Fig. 7 is a cross sectional detail view through my improved grease trap device, the view being taken along the line VII—VII in Fig. 6 and looking in the direction of the arrows.

Fig. 8 is a detail perspective view of the trap basket as seen in an open position, the view being taken from above the trap basket.

Fig. 9 is a detail perspective view of the trap basket as seen in an open position, the view being taken from below the trap basket.

Fig. 10 is a detail perspective view of the trap basket as seen in a closed position, the view being taken from above the trap basket.

Fig. 11 is a detail perspective view of the trap basket as seen in a closed position, the view being taken from below the trap basket.

Similar numerals of reference designate the same parts throughout the several figures of the drawings.

In the drawings is shown my improved grease trap device which comprises a container having a front side wall 12, a rear side wall 13, end walls 14 and 15, a bottom 16, and partition walls 17, 18 and 19 which form compartments A, B, C and D. The partition walls 17, 18 and 19 are cast integral with the bottom 16 and front and rear walls 12 and 13. The upper ends of the partition walls 17, 18 and 19 terminate a short distance below the upper edges of the front and rear walls 12 and 13. The upper edges of the front and rear walls 12 and 13 and the end wall 14 above the level of the upper edges of the partition walls 17, 18 and 19 are made thinner than the lower portion of the front and rear walls 12 and 13 and the end wall 14 so as to form a supporting ledge E around the top of each of the chambers A, B and C for purposes that will later be explained.

In each of the compartments A, B and C is formed a vertically positioned tube like element 20, 21 and 22, each of which are formed integral with the bottom 16 and their respective wall 14, 17 and 18 so that the bottom ends of the tubular elements 20, 21 and 22 are closed and their upper ends are open.

At the bottom of the end wall 14 is a nipple formation 23 that is integrally formed on the end wall 14 and provides an opening or passage 24 into the lower portion of the tubular element 20 in the compartment A. The nipple 23 is threaded to receive a suitable pipe fitting for connections to a drain pipe from a sink or other fixture.

In the lower portion of each of the partition walls 17 and 18 is a hole 25 and 26, each of which opens into the lower portion of their respective tubular element 21 or 22. In the lower portion of the partition wall 19 is a hole 27 that provides a passage from the lower portion of the compartment C into the lower portion of the compartment D.

At the upper end of the end wall 15 is a nipple formation 28 that is integrally formed on the end wall 15 and provides a passage into the compartment D at a point just slightly below the upper edge of the compartment walls 17, 18 and 19. The holes 25, 26 and 27 and the passage through the nipple 28 are preferably larger than the passage 24 through the nipple 23 and end wall 14 for reasons that will later be made obvious.

Each of the compartments A, B and C are provided with clean out plugs 29, 30 and 31 that are threaded into the bottom 16 of their respective compartment.

Each of the compartments A, B, and C are provided with an inspection glass I, J, K respectively. As shown in Fig. 7 the glass I, J and K are positioned over openings 32, 33 and 34 respectively in the front wall 12 and are seated in rabbeted formations around the opening, there being a suitable plastic or gasket in the rabbet to form a liquid and gas tight joint between the glass and the wall 12. At 35 is shown a slotted frame that is positioned over the glass I, J, K and lapping over onto the metal wall 12 and being rigidly fastened thereto by means of screws 36 in such a manner as to retain the glass I, J and K in their respective rabbet formation. It will be understood that the slot in the frame 35 registers with its respective opening 32, 33 or 34 so as to not obstruct vision into the compartment A, B and C.

Closely fitted within the upper portions of each of the compartments A, B and C is a screen grease trap basket F, G and H respectively. The side walls of the basket are preferably made of fine mesh screen wire the upper edges of which is rigidly attached (soldered) to a frame 37 that has an outwardly extending flange 38 that is adapted to rest on the top edge of the partition walls 17, 18 and 19 and on the shoulder formed in the upper portion of the front and rear walls 12 and 13 and the end wall 14 in such a manner as to removably support the grease trap basket in its respective compartment A, B and C.

The frame 37 is provided with a channel shaped cross bar 39 that is positioned midway of opposite sides of the frame 37 for purposes that will later be made obvious.

The bottom edge of the screen is preferably rolled around a heavy wire frame and is rigidly attached thereto preferably by being soldered. The screen grease trap basket is provided with a screen bottom made in two halves 40 and 41, the edges of the screens forming the bottom being rolled around a heavy wire rectangular shaped frame and being soldered thereto to form the composite bottom halves 40 and 41. At 43 is shown sheet metal strips that are bent around the wire frame of the bottom edge of the grease trap basket and one side of the wire frame forming the bottom in such a manner as to form a hinge mounting of the halves of the bottom on the basket, the halves of the bottom being mounted on opposite sides of the bottom edge of the basket as shown.

At 43 is shown a rod or heavy wire that is slidable longitudinally through a hole 44 in the center of the channel bar 39. The rod 43 is provided with an eye formation 45 and 46 on either end thereof. In the eye 45 is positioned a ring 47 by which the rod 43 may be lifted for purposes that will later be described.

At 48 and 49 is shown a pair of rods. One end of the rod 48 is bent around the wire forming the free side of the half bottom 40 to form a hinge connection at the point 50, the other end of the rod 48 having an eye formation 51 thereon and through which passes the ring 46. Similarly one end of the rod 49 is bent around the wire forming the free side of the half bottom 41 to form a hinge connection at the point 52, the other end of the rod 49 having an eye formation 53 thereon and through which also passes the ring 46. This arrangement is such that when the rod 43 is raised upwardly the halves 40 and 41 forming the bottom of the basket are pulled from their open position as shown in Figures 8 and 9 to their closed position as shown in Figures 10 and 11.

The enclosure defined by the bottom 16 and walls 12, 13, 14 and 15 is provided with a cover 54 that is provided with a depending flange portion 55 that extends continuously around the outer edge of the cover 54 and overlaps the upper edge of the walls 12, 13, 14 and 15. At 56 is shown a gasket that is positioned intermediate the cover 59 and the upper edge of the walls 12, 13, 14 and 15.

On the outside and toward the top of each of the end walls 14 and 15 is integrally formed a pair of vertically positioned and outwardly projecting ear-like elements 57 and 58, and 57a and 58a that are spaced apart and between which is pivotally mounted one end of a bolt 59 and 60 at the points 61 and 62.

Also on the outside of, and adjacent the top edge of the end walls 14 and 15, and integrally formed thereon is outwardly projecting and horizontally positioned ear-like elements 63 and 64 that are provided with slots 65 and 66 into which the bolts 59 and 60 may be positioned as a guide therefor.

Integrally formed on the ends of the cover element 54 are outwardly projecting and horizontally positioned ear-like elements 67 and 68 that are provided with open ended slots 69 and 70 into which the bolts 59 and 60 may be rocked into, and out of. On the upper end of the bolts 59 and 60 is threaded wing nuts 71 and 72 that may be screwed to engage the ear-like elements 67 and 68 to rigidly clamp the cover element 54 against the gasket 56 to secure an air tight mounting of the cover element 54 on the enclosure 16—12—13—14—15.

The cover element 54 is provided with a handle 73 that is preferably integrally formed on the cover element 54.

The foregoing described device is carried on a support device which comprises a base element 74 that is preferably supported on three small leg-like elements 75, 76, and 77. On the base element 74 is integrally formed a vertically positioned tubular portion 78 that is rigidly held in position by rib-like elements 79, 80 and 81 that are integrally cast with the base element 74 and the tubular element 78.

In the tubular portion 78 is slidably positioned a shaft or tubular element 82 that is rigidly stationed in the tubular portion 78 by means of a set screw 83 that is threaded through the wall of the tubular portion 78 and engages the shaft or tubular element 82 for locking purposes as will be readily understood.

On the outside of the rear wall 13 and outwardly projecting therefrom and integrally formed thereon is a pair of ear-like elements 84 and 85 that are spaced apart and vertically positioned, one above the other. In each of the ear-like elements 84 and 85 is a hole through which the shaft or tubular element 82 slidably passes. A set screw 86 is threaded through the ear-like element 85 and engages the shaft or tubular element 82 for locking purposes as will be readily understood.

To install my improved grease trap the device may be set on the floor at the desired location, then one of the set screws 83 or 86 may be loosened and the grease trap may be raised or lowered to the desired position whereupon the set screw may again be tightened so as to hold the grease trap in the desired adjusted position. This being done a drain pipe from a sink or other suitable plumbing fixture may be connected to the nipple 23; and another drain pipe may be connected to the nipple 28 and to a suitable sewer line or drain as will be readily understood, the device is now ready for use.

The operation of the device is as follows: Water is entered into the device from the plumbing fixture through the nipple 23 and passage 24 therein until the water reaches the water level as indicated by the line 87 whereupon any additional water will flow out through the drain nipple 28 and to the sewer.

Now as water containing grease is entered through the nipple 23 and through the passage 24, it will flow into the tubular element 20 and through the passage 24, it will flow into the tubular element 20 where the flow is directed into an upwardly direction into the compartment A wherein the grease, due to it being lighter than the water, will separate from the water and rise therein and float thereon at the water line 87 and within the grease trap basket F in the compartment A. As additional grease laden water is entered into the compartment A as above described, the same grease separating process will take place and the excess water will pass through the passage 25 and upwardly in the tubular element 21 into the compartment B where, if any grease still remains in the water it will be separated therefrom in the same manner as it was in the compartment A and the grease again floats on top of the water in the compartment B and is accumulated in the grease trap basket G. Now as still more grease laden water is entered into the compartments A and B as described, water from the compartment B will flow through the passage 26 and upwardly through the tubular element 22 into the compartment C and any, if any grease should still be contained in the water being entered into the compartment C the grease will be separated from the water in the compartment C the same as in the compartments A and B, and the grease will float on the water in the compartment C and in the grease trap basket H the same as described in the compartments A and B. Now the still further entering of liquid into the device will cause the liquid (water) to flow through the passage 27 into, and rise in the compartment D and overflow or drain out through the nipple 28 and to the sewer as will be readily understood.

From the foregoing description it will be noted that the direction of flow of travel of the liquid through each of the compartments A, B and C is up and then down, the turn in the flow occurring in the upper portion of the compartment, and the grease being lighter than the water will more readily separate from the water in a turn such as developed in this device than it will in other devices for the same purpose.

After the device has been in use for some time, enough grease will accumulate in the compartments A, B and C that it becomes necessary to remove the grease from the compartments. The amount of grease in the compartments may be observed by looking through the inspection glasses I, J and K.

Now to remove the grease from the compartments by loosening the wing nuts 71 and 72 on the bolts 59 and 60, whereupon the bolts 59 and 60 may be swung outwardly from the cover element 54 thereby releasing the cover 54 whereupon the cover 54 may be lifted by the handle 73 from over the compartments A, B, C and D.

This having been done the person cleaning the trap may place his finger in the ring 47 and pull upwardly thereon, whereupon the rod 43 is pulled upwardly and which in turn through the links 48 and 49 will pull the halves 40 and 41 of the bottom of the grease trap basket from the open position shown in Figures 6, 8 and 9 to the closed position shown in Figures 10 and 11, then by the still further lifting by the ring 47 the entire grease trap basket F, G or H may be lifted from its respective compartment A, B or C. Obviously the closing of the bottom of the grease trap basket F, G or H takes place below the grease that is floating on top of the water in the compartment A, B or C and as the grease trap basket is lifted from the compartment the grease is caught in the grease trap basket and removed from the compartment in the grease trap basket.

Now the grease trap basket containing the grease being removed from its compartment may be emptied by supporting the grease trap basket by the cross bar 39 and releasing the ring 47, whereupon the closed halves 40 and 41 of the basket will fall to their open position as shown in Figures 8 and 9 and the grease in the basket will fall therefrom. The grease trap basket being so emptied may now be rinsed off if desired and replaced in its respective compartment in the position shown in Fig. 6. The cover 54 may now be replaced over the compartments A, B, C and D and rigidly fastened thereover by means of the bolts 59 and 60 and the wing nuts 71 and 72 thereon as previously described and the device is now ready for further use.

Such modifications of my invention may be employed as lie within the scope of the appended claims without departing from the spirit and intention of the invention. Now having fully shown and described my invention, I claim:

1. In a grease trap device; a container, said container having side and end walls and a bottom, said container having a plurality of partition walls therein, said partition walls joining the side walls and bottom of the container to form a plurality of successive compartments through the container, said partition walls terminating short of the top of the container, said partition walls having an opening therethrough and in the lower portion thereof, a tubular element in all but the last of the compartments, said tubular elements being made integral with the bottom of the container, their respective wall element and being open at the top thereof, the tubular element joining the end wall of the container having pipe connection means for receiving drainage at the bottom of the tubular element, the balance of the tubular elements having an opening therein for receiving drainage from their adjacent preceding compartment, the last of said partition walls having an opening therethrough and at the bottom thereof to admit drainage from next to the last compartment into the last compartment, the other end wall having a discharge opening therethrough and adjacent the top thereof for draining the last compartment of the container, a plurality of grease baskets, one for each except the last compartment, said grease baskets being positioned in the upper portion of their respective compartment and being supported on the upper edge of the walls enclosing their respective compartment, each of said baskets having means whereby the basket may be lifted from its respective compartment, the bottom of said baskets having hinged closure elements thereon, said closure elements being operable from said lifting means, and a cover for said container, and means whereby said cover may be removed and replaced all for the purpose described.

2. In a grease trap device of the kind described; said container having a plurality of partition walls therein to divide the container into a plurality of compartments, a removable cover for said container, and means for sealing said cover on said container, a plurality of grease trap baskets, one for each compartment except the last compartment, each of said baskets having an outwardly extending flange around the top thereof, said basket having screen sides, the upper edge of said screen sides being fixed to the said flange element, a bottom for said basket, said bottom comprising a pair of screened frame elements, said frame elements being hingedly attached to opposite bottom edges of the basket, a pair of link elements, and a lifting element, one end of each of said link elements being hingedly joined to the lower end of the lifting element, the free end of said link elements being hingedly joined one to each of the lower edge of said frame elements the upper end of said lifting element being supported on the upper portion of said basket, said lifting element and links functioning by the raising of the lifting element to swing the bottom frame elements to closed positions and then support the basket for lifting purposes upon the continued upward movement of the lifting element, the end and partition walls of said container having openings therein for permitting a continuous flow through said compartments as shown and described.

ELMORE B. MARPLE.